A. M. SAWYER.
Peat Machine.

Patented Oct. 1, 1867.

Witnesses:
Chas. A. Jordan
Wm. C. Hibbard

Inventor:
A. M. Sawyer

A. M. SAWYER.
Peat Machine.

Patented Oct. 1, 1867.

Witnesses:

Inventor:
A. M. Sawyer

United States Patent Office.

ADDISON M. SAWYER, OF ATHOL, MASSACHUSETTS.

Letters Patent No. 69,370, dated October 1, 1867.

---

IMPROVED MACHINE FOR PREPARING PEAT FOR FUEL.

---

The Schedule referred to in these Letters Patent and making part of the same.

---

TO ALL WHOM IT MAY CONCERN:

Be it known that I, ADDISON M. SAWYER, of Athol, in the county of Worcester, and State of Massachusetts, have invented a new and useful Improvement in Machines for Preparing Peat for Fuel; and I do hereby declare the following to be a full, clear, and exact description thereof, reference being had to the accompanying drawings, making a part of this specification, in which—

The same letters refer to the same parts in all drawings.

Figure 1:
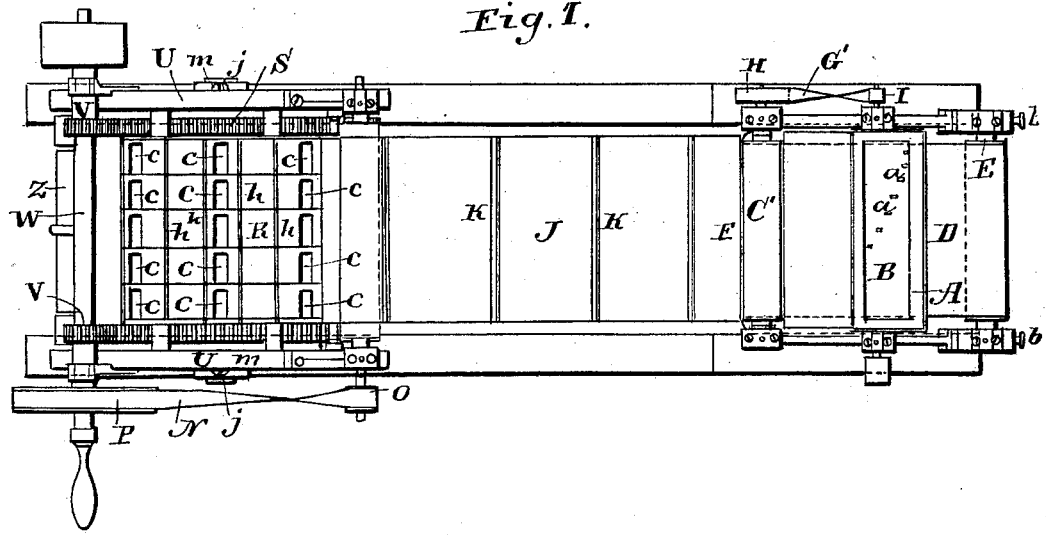
Figure 1 is a plan of my machine.
Figure 2:
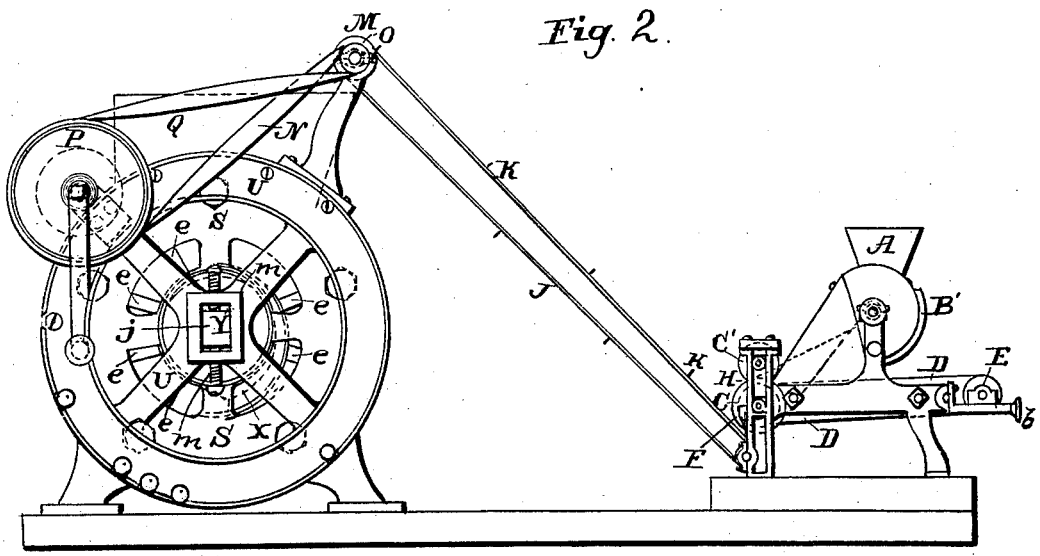
Figure 2 is a side elevation of the same.
Figure 3:
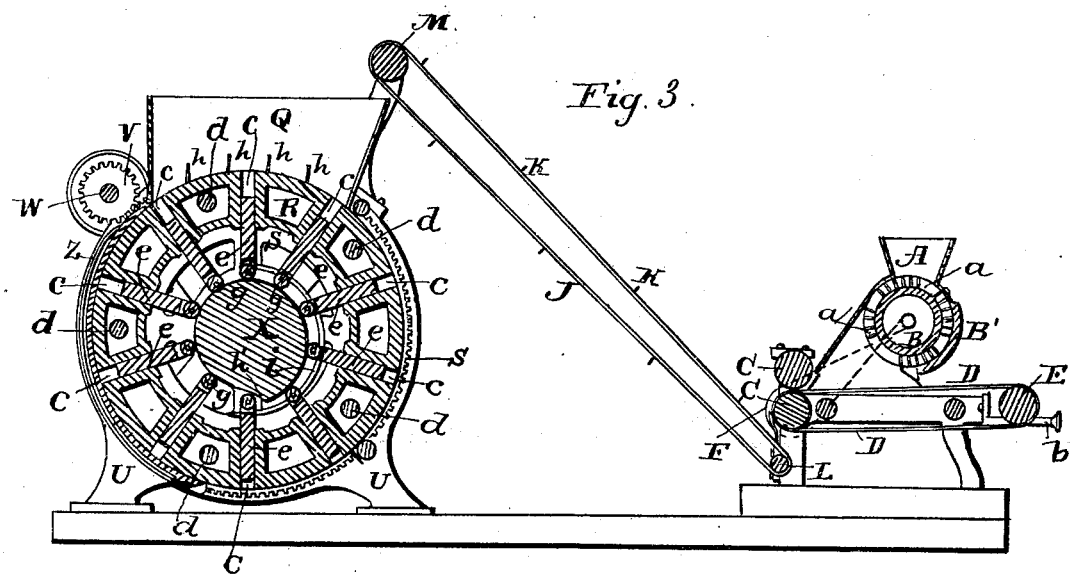
Figure 3 is a vertical longitudinal section through centre of machine.

In the manufacture of peat, as usually practised, the peat as it comes from the bog is by some suitable mechanism disintegrated or ground up into a homogeneous semi-fluid mass, caused by the large amount of water contained in it, which is afterwards formed into blocks or pieces of convenient size and shape, and dried for use.

My invention relates, in the first place, to the mechanism for pressing the water from the peat after it has been suitably disintegrated, and consists in combining with the grinding or disintegrating apparatus a horizontal endless belt or apron, of canvas or other pervious material, so arranged beneath the said grinding apparatus that the ground peat will fall directly upon said apron and a pair of squeezing-rollers, around the lowermost one of which the apron passes, by which means the wet mass is at first somewhat drained, by the water passing off through the apron, and is then squeezed by passing through the pressure-rollers, so that a large part of the water is removed from it, and it is discharged, after passing the rollers, in a damp condition. It also consists in the employment, in combination with the endless belt or apron and squeezing-rollers, of a scraper, working close to the surface of the apron, to remove the peat that may adhere to its surface after the compression.

My invention relates, in the second place, to the manner of constructing the revolving mould-wheel and the parts that work in connection with it, for compressing the prepared peat or other similar material into bricks or blocks of convenient size for use, and consists in the employment, in combination with the revolving series of moulds, of a series of scrapers, placed within the hopper that receives the prepared peat, above said wheel, and close to the exterior of the moulds, so as to repeatedly scrape off the excess of material, and thereby insure the filling of the moulds uniformly with the same quantity of material; and secondly, in mounting the cams that work the pistons in the moulds in adjustable bearings, so arranged, in combination with the series of revolving moulds, that the compressing capacity of the moulds may be varied, as will be more fully described.

I construct my machine in the following manner:

A is the hopper or receptacle into which the peat is placed as it is taken from the bog.

B is the grinding or disintegrating cylinder, armed with projecting fingers or teeth $a$ $a$, and revolving within a fixed casing, B', also provided with like fingers or teeth, the cylinder being so arranged with relation to the casing that the moving fingers of the cylinder shall pass between the fingers on the shell, and serve to completely disintegrate the matter of which the peat is composed.

C and C' are pressure-rolls for expressing the water from the peat after it has passed through the grinding apparatus.

D is an endless belt or apron, made of canvas or other pervious material, and placed in a horizontal position directly under the cylinder B, passing around the rolls C and E. The bearings of the roll E are provided with adjusting-screws $b$ $b$, by means of which the apron may always be kept taut. The peat, as it leaves the grinding-cylinder, falls directly upon the apron D, in its semi-fluid state, where it is partially drained, by the water passing through the apron, and is then carried by the forward movement of the apron between the pressure-rolls C and C', where another portion of the water is expressed from the peat and allowed to flow off.

F is a scraper attached to the frame of the grinding apparatus in such a manner that its edge comes close to the surface of the apron, and serves to remove the peat that may adhere to it after passing the pressure-rolls. Said rolls are driven from the grinding-cylinder by means of the belt G and pulleys H and I.

J is another endless belt or apron, made of canvas or other suitable material, and provided with buckets or carriers K K, for conveying the peat from the grinding apparatus to the hopper of the moulding apparatus. Said apron passes around the rolls L and M, and is set in motion by means of the belt N and pulleys O and P. The buckets K K discharge the peat, as they pass over the roll M, into the hopper Q, which is attached to the frame of the moulding apparatus, and directly over the mould-wheel R. In the hopper Q is placed a series of scrapers, h h, parallel to the axis of the mould-wheel, and with their lower edges close to the exterior surface of the same, the purpose of which is to scrape off any excess of material from the moulds as they pass under them, and insure the filling of the moulds uniformly with the same quantity of material.

The mould-wheel R is made up of a series of annular rings, in the side of each of which is formed a series of radial rectangular-shaped grooves, which, when the rings are placed in position, form the moulds c c.

To complete the mould-wheel a head, S, in the form of a spur gear-wheel, is added at each end, and the whole firmly bolted together by the bolts d d. The hub of the spur-gear S, which forms the head of the mould-wheel, has a hole bored in its centre, and concentric with the periphery of the mould-wheel, by means of which the mould-wheel is mounted on the hubs T that project inwardly from the frames U, and on which it revolves. The mould-wheel is made to revolve by means of the spur-gears S and the pinions V on the driving-shaft W. About one-third, more or less, of the external surface of the mould-wheel is enclosed in a stationary segmental shell or casing, Z, bolted firmly to the frames U, as shown, and polished on its inner surface, so as to accurately fit the outer surface of the mould-wheel R, and serves as a platen, against which the mass of peat contained in each mould is successively compressed by the action of the cams X upon the pistons e e as the mould-wheel revolves.

Figures 4, 5, 6, 7, 8:
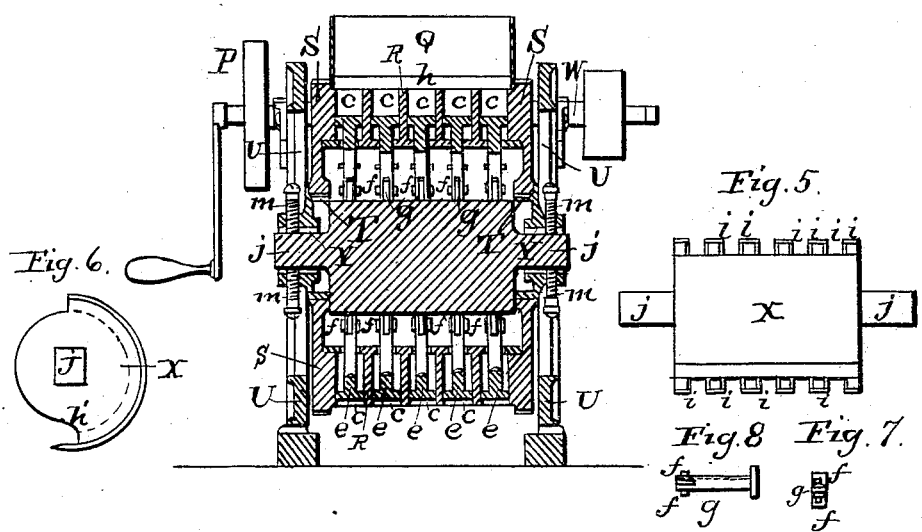
Figure 4 is a vertical transverse section through centre of mould-wheel.
Figure 5 is a side elevation of the fixed or stationary cams for operating the pistons or plungers.
Figure 6 is an end view of the same.
Figures 7 and 8 are views of the plunger.

The centre hubs T of the frame U have slots Y made through them, and provided with set-screws on their upper and lower sides, into which the square ends of the cam-bar J are fitted, and by which the cams X are held in a fixed position. Each mould is provided with a plunger or piston, e, on the inner end of which are mounted the friction-trucks f f and g, as seen in detail in figs. 7 and 8. These plungers are moved out and in, as required, by means of the fixed cams X mounted on the cross-bar J, the square ends of which are fitted in the slots Y, and passing through the centre of the mould-wheel on the line of its axis. The cams X are constructed substantially as shown in detail in figs. 5 and 6, and placed in such a position that as the mould-wheel revolves the pistons of those moulds which are uppermost shall be in their lowest position, so as to present the greatest capacity of mould to receive the peat as it comes from the grinding apparatus. Each piston remains in such lowest position until the mouth of its mould is covered by being carried under the casing Z, when the cam X begins to act upon it to force it toward the periphery of the mould-wheel, and thus compress the material contained within its mould against the shell or casing Z. This motion is continued until the mould has passed the lower edge of the casing Z, when the peat, having been sufficiently compressed, is forced out of the mould and deposited upon a moving apron under the mould-wheel (not shown) by the action of the inclined plane on the cam X, shown at h', fig. 6. Those portions of the cams X which act upon the pistons while they are moving from the under to the upper side of the mould-wheel are made in the form of a T-shaped groove, the lips i i of the groove serving to draw the pistons inward by their action upon the friction-trucks f f; so that the moulds may be in a condition to be again charged with peat when they arrive at the hopper Q. Those portions of the cams X which form the lips i i extend under the cams, as shown in fig. 6, to prevent the plungers from being thrown too far out of the mould when the block of peat is discharged, and insure the pistons being drawn inward at the proper time. The cams X may be adjusted at will, by means of the set-screws m, acting upon the cam-bar J so as to place the cams in a position more or less eccentric to the mould-wheel, and thereby increase or diminish the compressing capacity of the mould, as may be required, by increasing or diminishing the capacity of the mould when it is filled, and diminishing or increasing to the same extent the space into which the enclosed mass is to be compressed.

The mode of operation of the several parts of the mechanism is believed to be sufficiently set forth by the description.

What I claim as my invention, and wish to secure by Letters Patent, is—

1. The combination of an apparatus for grinding or disintegrating the peat, the endless apron b, and the squeezing-rollers C and C', arranged substantially as described.

2. The combination of the endless apron b, the squeezing-rollers C and C', and the scraper F, substantially as described.

3. The scrapers h h within the hopper R, in combination with the series of moulds, substantially as described.

4. Arranging the cams that work the pistons in and out, so as to be adjustable, as described, so that the movement of the pistons in the direction of the diameter of the mould-wheel may be varied, and thereby the compressing capacity of the moulds be increased or diminished, substantially as described.

Executed at Boston this sixth day of July, 1867.

<div align="right">A. M. SAWYER.</div>

Witnesses:
   CHAS. A. JORDAN,
   W<sup>m</sup> C. HIBBARD